(12) United States Patent
Farrell

(10) Patent No.: US 7,457,643 B2
(45) Date of Patent: Nov. 25, 2008

(54) EAR MOUNT ASSEMBLY FOR A COMMUNICATION DEVICE

(75) Inventor: Steven D. Farrell, Marlton, NJ (US)

(73) Assignee: Steve Farrell, Marlton, NJ (US)

( * ) Notice: Subject to any disclaimer, the term of this patent is extended or adjusted under 35 U.S.C. 154(b) by 533 days.

(21) Appl. No.: 11/352,054

(22) Filed: Feb. 10, 2006

(65) Prior Publication Data

US 2006/0199625 A1    Sep. 7, 2006

Related U.S. Application Data

(60) Provisional application No. 60/658,515, filed on Mar. 3, 2005.

(51) Int. Cl.
*H04B 1/38* (2006.01)
*H04M 1/00* (2006.01)

(52) U.S. Cl. ................... 455/569.1; 455/575.2

(58) Field of Classification Search .............. 455/550.1, 455/569.1, 575.1, 575.2, 575.6; 379/420.01, 379/420.02, 420.03, 420.04, 430, 433.01
See application file for complete search history.

(56) References Cited

U.S. PATENT DOCUMENTS

| | | | |
|---|---|---|---|
| 4,048,453 A | 9/1977 | Seidel | |
| 4,121,061 A | 10/1978 | Donaldson | |
| 4,367,378 A | 1/1983 | Jordan | |
| 4,802,211 A | 1/1989 | Huntley | |
| 4,821,317 A | 4/1989 | Wong | |
| 5,407,113 A | 4/1995 | Golliher | |
| 5,524,291 A | 6/1996 | Rio et al. | |
| 5,668,869 A | 9/1997 | Zinno | |
| 5,689,558 A | 11/1997 | Osgood et al. | |
| 5,729,615 A | 3/1998 | Yang | |
| 6,374,090 B1 | 4/2002 | Morales | |
| 6,639,985 B1 | 10/2003 | Liu | |
| 6,801,624 B2 | 10/2004 | Muramatsu et al. | |
| 6,914,997 B2 | 7/2005 | MacDonald et al. | |
| 7,120,247 B1 * | 10/2006 | Wade | ........................ 379/430 |
| 2004/0023633 A1 | 2/2004 | Gordon | |
| 2004/0069823 A1 | 4/2004 | Condiff | |
| 2007/0060209 A1 * | 3/2007 | Medhin | ................... 455/569.1 |

* cited by examiner

*Primary Examiner*—Nguyen Vo
(74) *Attorney, Agent, or Firm*—Duane Morris LLP

(57) ABSTRACT

A communications handset support for handless operation of a handheld communications device including a cradle assembly for releasably receiving and supporting the communications handset. The cradle assembly including a pair of elongate spaced-apart rods wherein a first resilient one of the elongate rods is fixed along a portion of its length so as to be cantilevered. A clamp is supported upon the pair of spaced-apart rods that includes a semi-hollow beam having a central passageway and that is supported a second one of the elongate rods. An adjustable beam is slidingly received within the central passageway of the semi-hollow beam, and is fastened to an end of the first resilient one of the rods so that when the adjustable beam is slid outwardly and away from the semi-hollow beam, the first resilient one of the rods is biased thereby gripping a portion of the communications handset.

21 Claims, 11 Drawing Sheets

EAR MOUNT ASSEMBLY FOR A COMMUNICATION DEVICE

CROSS-REFERENCE TO RELATED APPLICATIONS

This application is related to, and claims the benefit of priority from U.S. Provisional Patent Application Ser. No. 60/658,515, filed Mar. 3, 2005.

FIELD OF THE INVENTION

The present invention generally relates to a telephone handset holder, and more particularly to a gripping device and method for securing a mobile telephone in close proximity to a user's ear.

BACKGROUND OF THE INVENTION

Telephone handsets are devices commonly used to receive telephone voice transmissions and to send user voice data. The term "handset," as used herein, refers to any communication instrument equipped with a receiver and a transmitter that enables a user to receive and transmit data, regardless of the type of data transmitted or received, be it analog or digital, or the means by which the data is routed, be it over a traditional telephone line, radio waves, coaxial cable, voice over IP, Ethernet, fiber optics, or any other means used now or contemplated in the future for transmitting and receiving data. Handsets have been used in a plethora of different devices, including conventional corded telephones, cordless telephones, modular cellular mobile telephones, or any other portable communication device found in the marketplace. During a telephone call, a person typically holds the telephone handset in one hand so as to position it in close proximity to the person's ear and mouth for the duration of the telephone call. While this is not an especially laborious task for the user, it nonetheless severely limits the user from carrying out other activities during the telephone call that would otherwise require the use of both of the user's hands.

People frequently use telephone handsets, particularly cordless and mobile telephones, to carry on conversations while engaged in other activities. These activities include, for example, using a computer, cooking, cleaning, walking, driving a motor vehicle, etc. With the increased prevalence and use of mobile telephones and other portable communication devices, there is a growing need for users to operate such devices without the use of their hands, thereby allowing users to carry out other tasks simultaneously. For example, mobile telephone users may have the need to talk on a mobile telephone and drive a vehicle at the same time. For safety purposes, it is advantageous for a driver to use both hands while driving and not have to hold a mobile telephone with one hand and drive with the other hand. Likewise, while talking on a mobile telephone, a mobile telephone user may need to carry out tasks that require both hands, such as typing on a computer or carrying out other administrative tasks. Many of these activities can be performed easier, more efficiently and safer via the use of two hands rather than the use of one hand. By being able to utilize both hands while talking on a mobile telephone or other such communication device, a user is able to increase efficiency and productivity. An apparatus and method that would allow hands free use of a telephone handset would ameliorate the problems prevalent in the prior art.

A number of telephone handset holders have been suggested and developed in the prior art in an effort to address the need to utilize such devices without the use of an individual's hand. One such attempt to resolve the above-described problem is provided in U.S. Pat. No. 4,048,453, issued to Seidel, which discloses a telephone handset support device. The device employs a standard headband, which fits over the user's entire head. One portion of the assembly is secured to the telephone earpiece via a one-piece molded plastic component. The telephone is attached to the headband assembly by unscrewing the telephone earpiece and inserting the earpiece section between the handle portion of the telephone hand set and the removable earpiece, before re-screwing the telephone earpiece. A user apparently must wear a large and inflexible headband, which is cumbersome and difficult to transport. Furthermore, the device can only be used with traditional non-mobile telephones, and cannot be used with more modern mobile telephones due to the lack of a removable earpiece found in devices.

A similar attempt to the Seidel patent is found in U.S. Pat. No. 4,121,061, issued to Donaldson. The telephone handset holder disclosed in Donaldson comprises a band that fits over the user's head and that connects to the telephone handset via a permanently affixed flexible joint. As with previous attempts to create user friendly telephone holding devices, the device disclosed by Donaldson does not completely solve the problems found in the prior art. The headband that supports the telephone is large in size and difficult to transport. In addition, the device disclosed by Donaldson requires the permanent installation of a flexible connector joint to the phone. Installing such a connector joint is time consuming and adversely affects the appearance of the phone by adding unnecessary weight to the mobile phone and disrupting a mobile phone's otherwise ergonomic design. Other U.S. patents have also disclosed a headband and a coupling mechanism fitted to the exterior of a telephone handset. For example, U.S. Pat. No. 4,881,256, issued to Malekos, discloses the use of a movable ball and socket coupling device which is attached to the exterior of the telephone handset. As with other prior art attempts, the device disclosed by Malekos adversely affects the design and appearance of the telephone handset, and consequently fails to adequately solve the problems found in the prior art.

Other prior art efforts have recognized the problems in using rigid head bands to support the telephone handset. In U.S. Pat. No. 4,367,378, issued to Jordan, a telephone holder is disclosed that comprise a rigid one-piece handset that affixes to a user's head via a flexible elastic band. The elastic band is connected to the telephone receiver by means of Velcro®. While the use of an elastic band solves the problem of transporting a rigid headpiece, the use of Velcro® to attach the elastic band to the telephone is not advantageous. Proper use of the handset disclosed by Jordan requires the installation of a Velcro® fastening component to the face of the telephone, which adversely affects the telephone's appearance and is not desirable to the end user. The use of Velcro® to bind a telephone handset to a holding device is also cited in other U.S. patent applications. For example, U.S. Pat. No. 5,689,558, issued to Osgood et al., discloses a telephone hand set holder that mounts to the user's head or headgear via the hock and loop fasteners that typically embody Velcro®. Just as with other prior art attempts that employ Velcro® to bind a telephone handset to a holding device, the support provided by Velcro® fails to adequately support the weight of most telephone handsets, thereby creating a large likelihood that the telephone handset could fall and become damaged.

Some prior art telephone handset holders have employed alternative means of supporting a telephone handset other than the use of a head band fitted around the user's head. For instance, in U.S. Pat. No. 4,802,211, issued to Huntley, the telephone handset is supported via a structure that fits over the user's head, rests on the user's shoulders, and is secured to the user via an adjustable strap that fits under the user's arms. The support structure is made of metal and has a rectangular is shape comprising two L-shaped components fitted with a vertical phone support cradle attached to one end of one of the L-shaped members. While the structure disclosed by Huntley enables a person to use a telephone without support from the user's hand, the structure is bulky, immobile, and time consuming to properly attach to the user.

Likewise, U.S. Pat. No. 4,821,317, issued to Wong, discloses a telephone handset support device that uses a combination of an elastic headband and a retractable metal rod to support the telephone handset. The elastic telephone support device disclosed in Wong comprises an extendable elastic loop that is placed around the user's head to support the upper end of the telephone headset, while an extendable support rod rests on the shoulder of the person to support the lower end of the telephone hand set. Both the elastic loop and the extendable support rod retract into the interior of the handset. Although the telephone support device disclosed by Wong is easier to carry and use than other prior art attempts to create a telephone support device, the device still has its deficiencies. The device only works with traditional telephone handsets, and does not work with more modern mobile phone embodiments because the extendable support rod does not fit in the interior of a mobile phone or other such communication device.

Other prior art attempts have employed various permutations of previous prior art efforts. U.S. Pat. No. 5,407,113, issued to Golliher, discloses a hands free telephone support device comprising an elongate strap that fits over the top of the user's head and wraps around the user's chin. Each end of the elongate strap is affixed to an end of the telephone receiver, with one end affixed via Velcro® and the other end of the elongate strap wrapped around the opposite end of the telephone receiver. The elongate strap is fully adjustable to a variety of head sizes, and can be used on the left or right ear of an individual, and used on a variety of different telephone types and/or telephone receivers. While the invention disclosed by Golliher attempts to solve some of the deficiencies found in other prior attempts, the device disclosed in Golliher is still flawed. The Golliher telephone support device comprises several pieces, requiring a user to put the device together before being able to speak into the phone without the use of the user's hands. This solution is inconvenient for the user and requires the expenditure of an inordinate amount of time. Moreover, because the elongate straps wrap around a user's chin and mouth area, a user's speaking patterns may become impeded and garbled due to the device's restrictive strap.

There have been some prior art efforts to create a telephone handset holding device that can specifically be used in conjunction with mobile telephones. For example, U.S. Pat. No. 5,668,869, issued to Zinno, discloses a mobile telephone handset holder that can be used in a motor vehicle. The mobile phone is supported via a device that slides onto a standard car seat belt. While the invention disclosed in Zinno provides adequate support for a mobile telephone, its limitations are clear. The mobile telephone holder disclosed by Zinno can only be used in a car and can not be utilized by a mobile phone user outside the car. Moreover, the positioning of the mobile phone holder is limited by the position of the seatbelt, thereby severely affecting the possible range of desired positions for the mobile telephone.

U.S. Pat. No. 5,729,615, issued to Yang, discloses an earphone for a mobile telephone handset that fits in the user's ear via a hanger. Yang incorporates a separate speaker element that fits into the user's ear and that must also be connected to the mobile phone via a cord and plug. Although the earphone is easy to transport, it nonetheless requires an additional means of attaching the mobile phone to some other part of the user's body to properly allow the user to utilize the mobile phone without the use of the user's hand. The various components are cumbersome and require multiple installation steps before the user can answer an incoming call or make an outgoing call.

U.S. Pat. No. 6,374,090, issued to Morales, discloses a cellular telephone handset holder that uses a clamp gripping device to support the sides and bottom of a mobile phone, before clipping it to a user's ear. The handset holder comprising multiple pieces and has an inner and outer clip portion that "pinches" the front and back lobes of a user's ear. The Morales' device apparently only works with mobile telephones that are "single piece," i.e., a phone without any movable components or a phone that doesn't have a "flip open" feature, which is found in many modern mobile telephone handset embodiments. Consequently, the invention disclosed in Morales is limited in use and does not adequately account for the various different types of mobile telephone handset shapes and sizes that permeate today's marketplace.

U.S. Pat. No. 6,639,985, issued to Liu, discloses a phone that utilizes an ear hanger assembly that hangs from a user's ear. While the invention disclosed in Liu addresses some of the problems found in the prior art, it nonetheless requires the permanent installation of the phone hanger to the mobile phone. Consequently, a user is required to physically attach the phone hanger to the mobile phone, adding extra time and cost. Moreover, permanently attaching the phone hanger to the telephone adds unnecessary thickness, girth and weight to the mobile phone, which is disadvantageous given the growing trend of mobile phone manufacturers creating lightweight and slim mobile phones to satiate consumer demand for compactness.

There is a need for a mobile telephone handset holding device that is small in size, easy to transport, requires little to no assembly and does not adversely affect the appearance or design of the mobile telephone. Moreover, there is a need for a mobile telephone handset holding device that can be used on a plethora of different types of mobile telephone models or other portable communication devices and that can account for variations in shapes, sizes and methods of operation.

SUMMARY OF THE INVENTION

The present invention provides a mobile telephone handset holding device having at least one clip that securely affixes to the mobile telephone or other portable communication device, regardless of the size or type of mobile telephone or portable communication device. The telephone handset holding device is mounted to the user's ear via a hangar assembly that allows the user to pivot the phone to various desired positions, and securely fastens the mobile telephone handset to the user, thereby freeing the user's both hands during the length of the conversation.

In a preferred embodiment, the present invention provides a communications handset support for handless operation of a handheld communications device including a cradle assembly for releasably receiving and supporting the communications handset. The cradle assembly including a pair of elongate spaced-apart rods wherein a first resilient one of the elongate spaced-apart rods is fixed along a portion of its length so as to be cantilevered. A clamp is supported upon the pair of spaced-apart rods that includes a semi-hollow beam having a central passageway and that is supported a second one of the elongate rods. An adjustable beam is slidingly received within the central passageway of the semi-hollow beam, and is fastened to an end of the first resilient one of the rods so that when the adjustable beam is slid outwardly and away from the semi-hollow beam, the first resilient one of the rods is biased thereby gripping a portion of the communications handset.

In another embodiment of the present invention, a communications handset support for handless operation of a handheld communications device is provided that includes a cradle assembly including an upper clamp supported upon a pair of spaced-apart rods. A first resilient one of the rods is fixedly fastened along a portion of its length to the upper clamp so as to be cantilevered. A lower clamp is supported upon the pair of spaced-apart rods, and includes a semi-hollow beam having a central passageway and an adjustable beam that is slidingly received within the central passageway. The adjustable beam is fastened to an end of the first resilient one of the rods so that when the adjustable beam is slid outwardly and away from the semi-hollow beam, the first resilient one of the rods is biased.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION OF PREFERRED EMBODIMENTS

Figure 1:
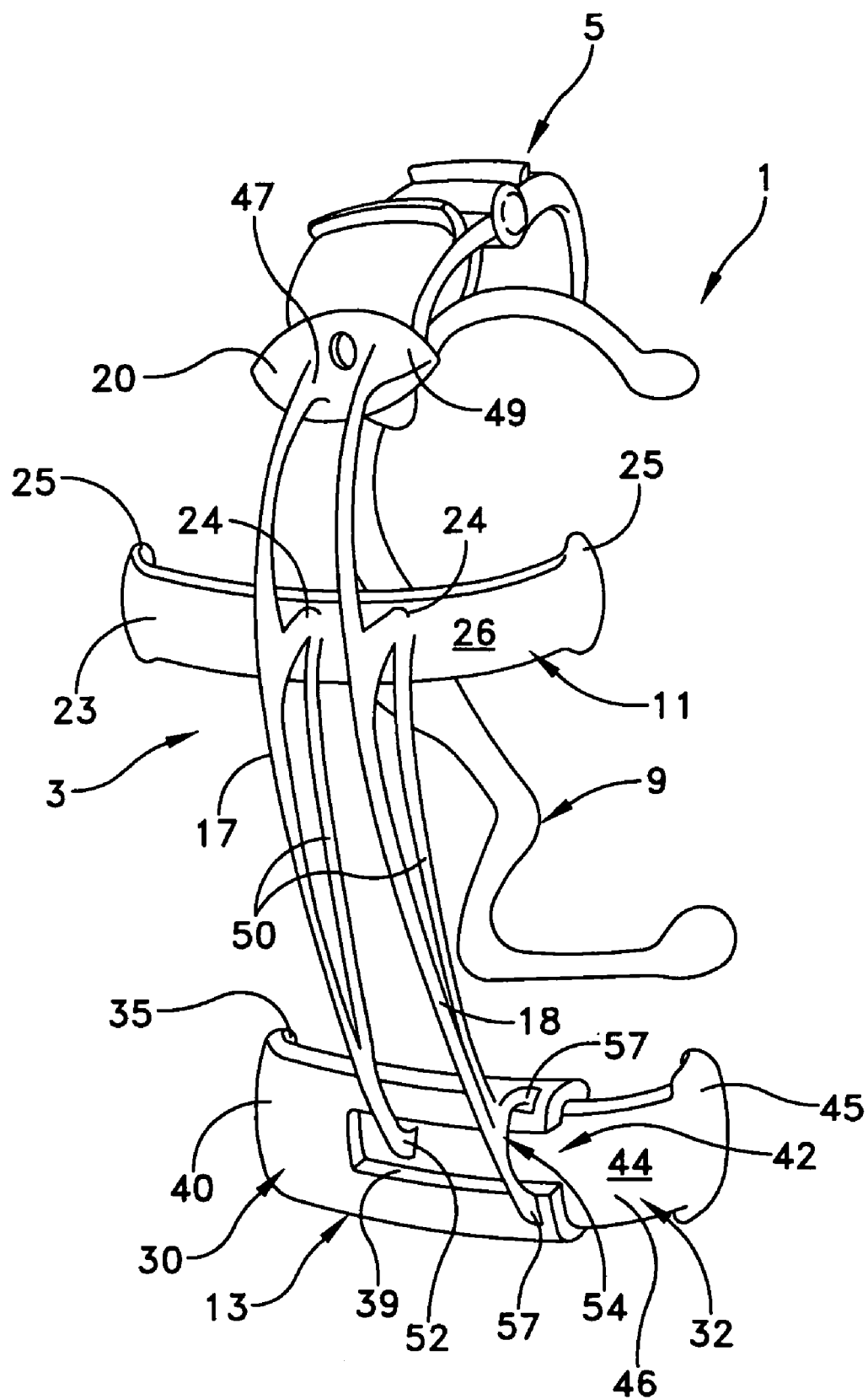
FIG. 1 is a perspective view of a communications handset support for handless operation of a handheld communications device formed in accordance with present invention without a handset.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "vertically," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

Referring to FIG. 1, a mobile telephone handset holder 1 formed in accordance with the present invention comprises a cradle assembly 3, a clamp assembly 5, and an ear hook 9. More particularly, cradle assembly 3 includes an upper clamp 11, a lower clamp 13, a first rod 17, a second rod 18, and a pivot hub 20. Cradle assembly 3 may be made of any suitable engineering material, such as, and without limitation, plastics, thermoplastics (crystalline or non-crystalline, cross-linked or non-cross-linked), thermosetting resins, elastomers, or composites thereof, metal alloys, ceramics, wood, wood-plastic composites, plastic-glass fiber reinforced composites, or other materials so long as they are sufficiently strong for supporting the weight of a handset.

Figure 2:
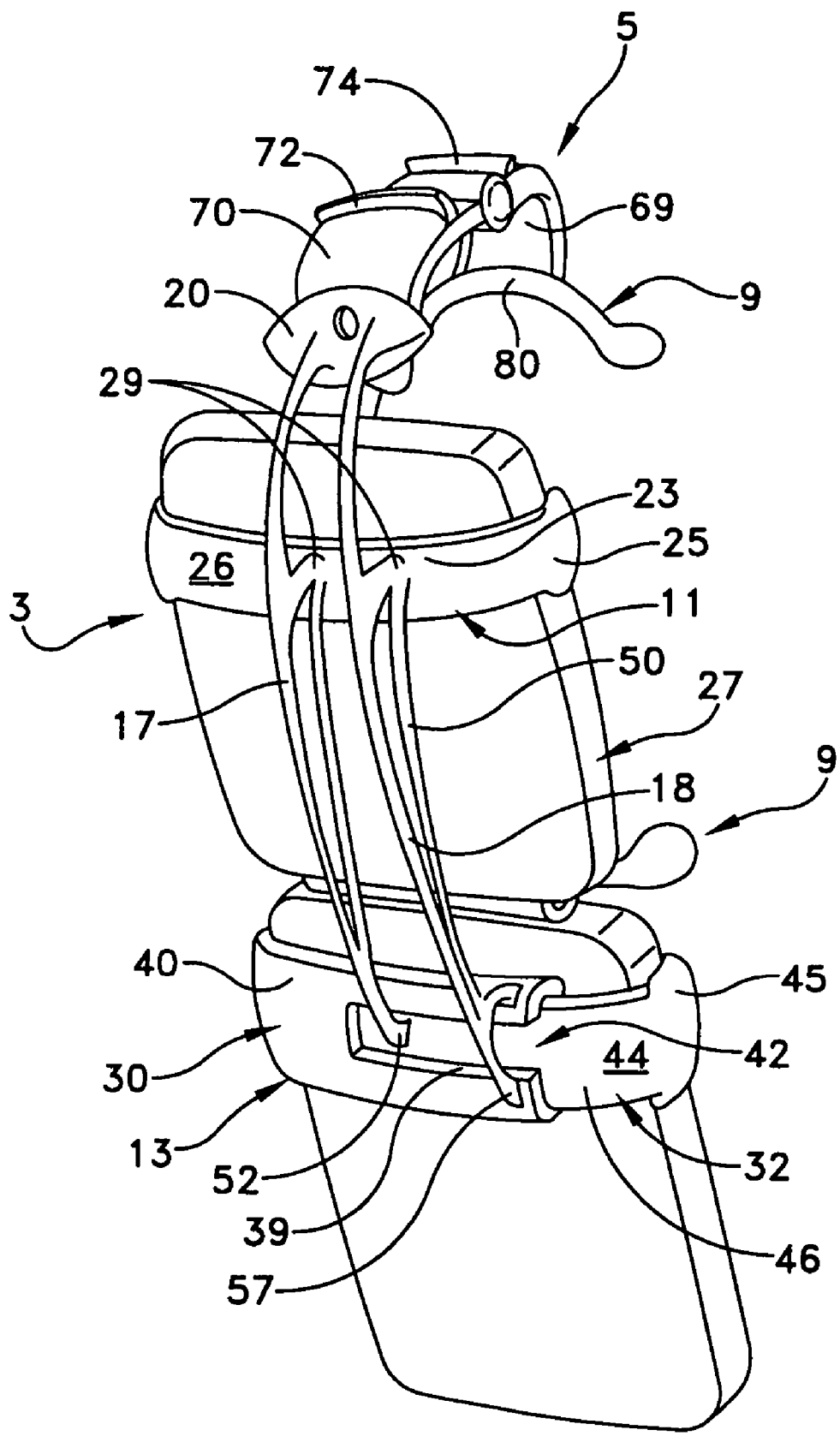
FIG. 2 is a perspective view of a communications handset support for handless operation of a handheld communications device formed in accordance with present invention with a communications handset installed.
Figure 3:
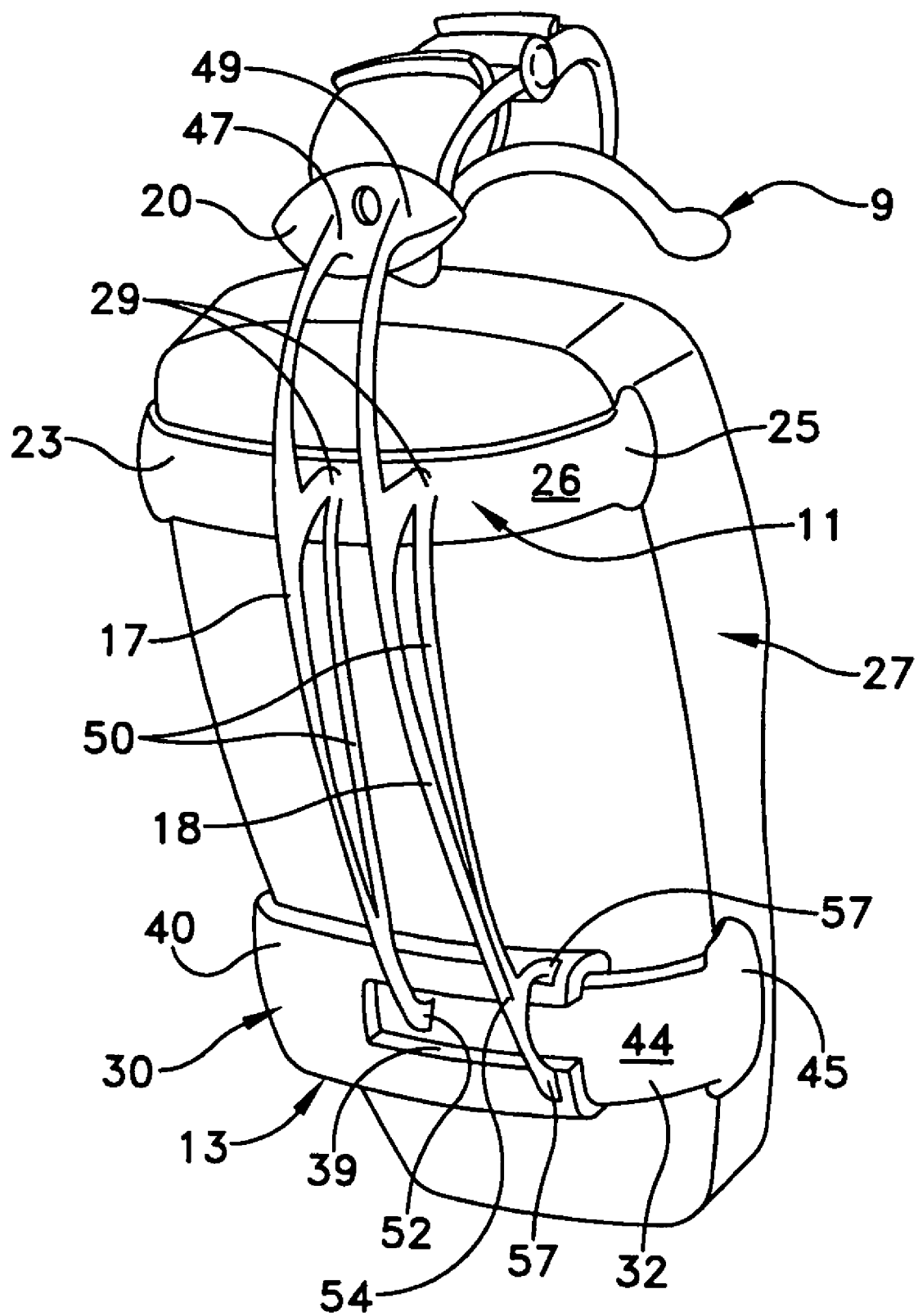
FIG. 3 is a perspective view of a communications handset support for handless operation of a handheld communications device formed in accordance with present invention with a communications handset.
Figure 4:
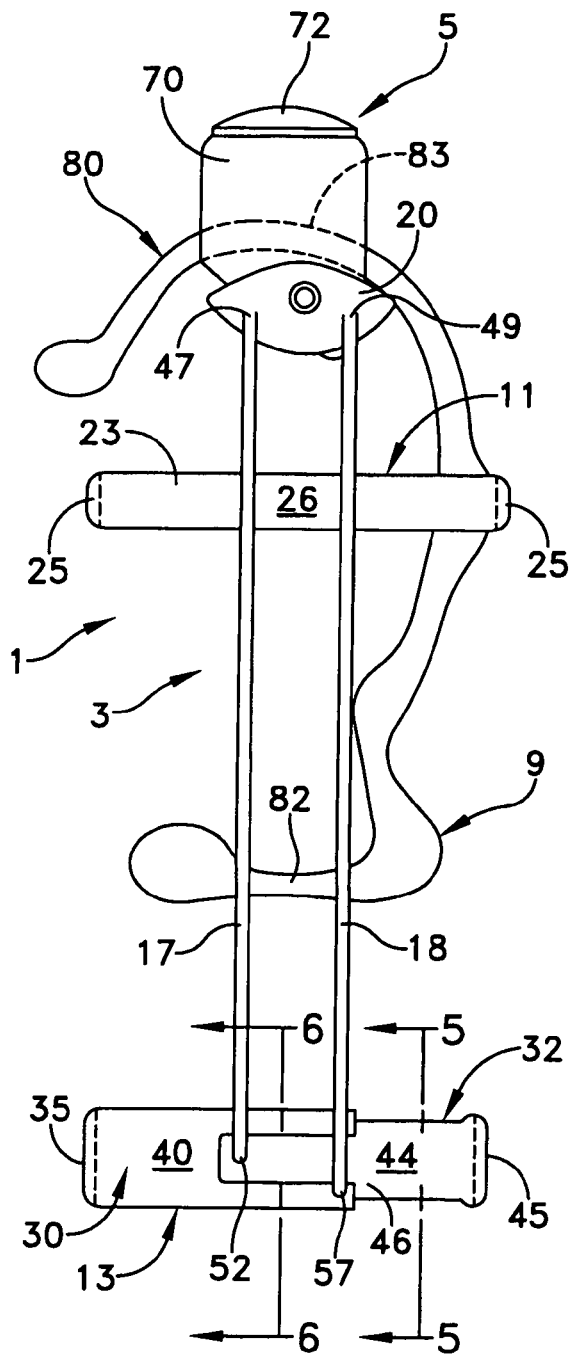
FIG. 4 is a side view of an embodiment of a communications handset support for handless operation of a handheld communications device.
Figure 5:
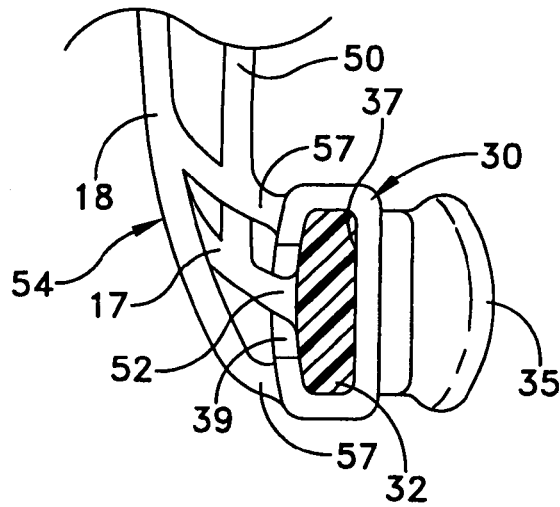
FIG. 5 is a side perspective view, partially in cross-section and partially broken-away, taken along lines 5-5 in FIG. 4.
Figure 6:
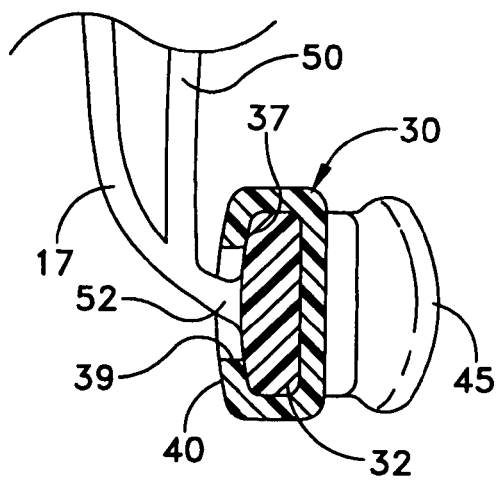
FIG. 6 is a side perspective view, partially in cross-section and partially broken-away, taken along lines 6-6 in FIG. 4.
Figure 7:
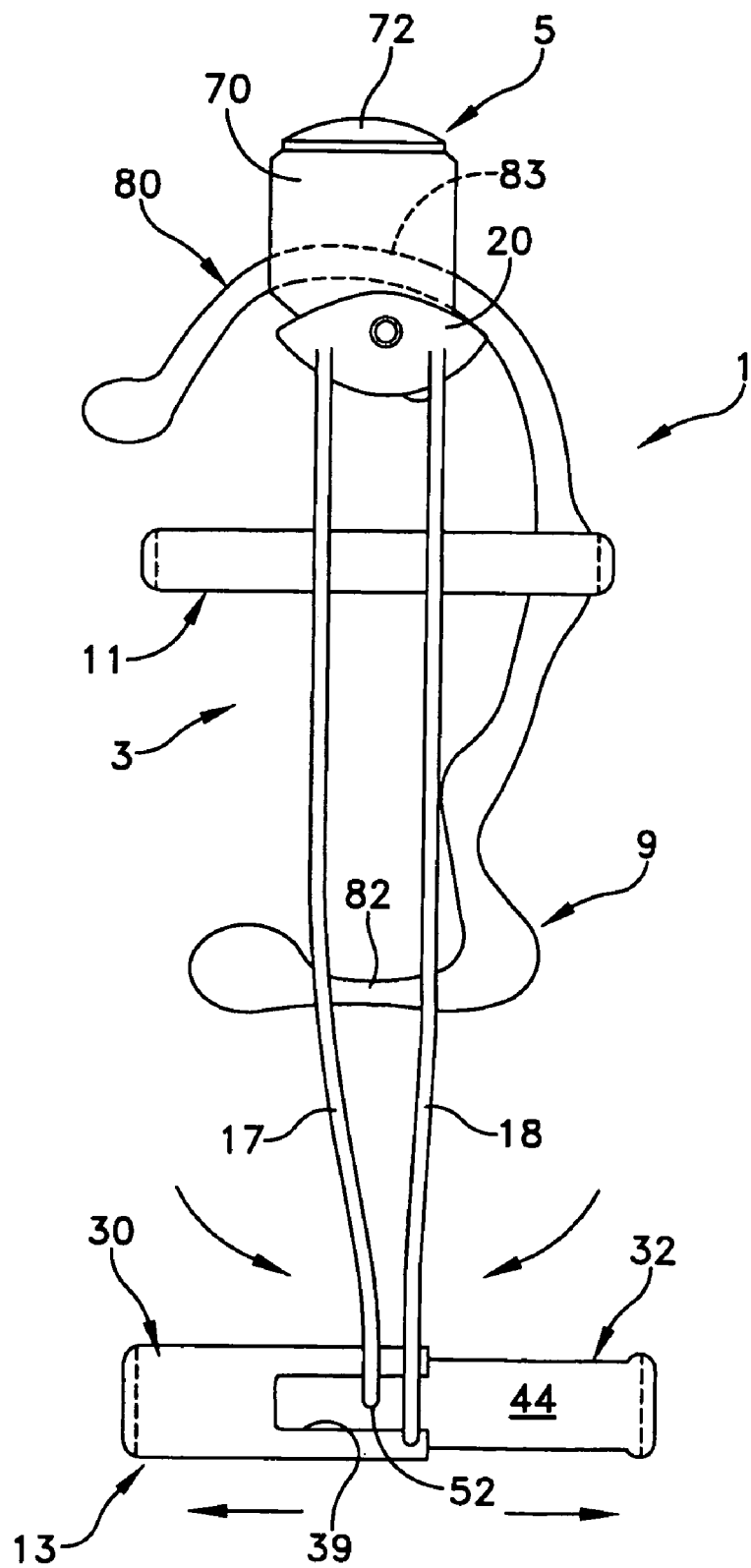
FIG. 7 is a side view of an embodiment of a communications handset support for handless operation of a handheld communications device illustrating the outward biasing of a lower clamp.

Upper clamp 11 often comprises a substantially arched or concave resilient profile, i.e. able to spring back quickly into shape after being bent, stretched, or deformed, including a resilient beam portion 23 having a pair of spaced apart confronting grips 25 defined at its free ends, and a back surface 26. Resilient beam portion 23 is sized and shaped so as to receive a typical telephone handset 27 (FIG. 2). Grips 25 are somewhat wider than resilient beam portion 23 so that each may releasably engage a side wall portion of telephone handset 27. The arched configuration allows upper clamp 11 to store elastic energy when grips 25 are deflected outwardly during engagement with telephone handset 27 (FIG. 2). Of course, upper clamp 11 may be formed so as to provide for transverse adjustments (widening or narrowing) thereby accommodating a wide variety of communications handsets with out departing from the scope of the present invention.

Referring to FIGS. 1, 2, and 4-6, lower clamp 13 includes a semi-hollow beam 30 and an adjustable beam 32. Semi-hollow beam 30 comprises a substantially arched or concave profile with a grip 35 located at a free end and a blind passageway 37 that is axially defined and centrally located. A slot 39 is defined in a rear wall 40 of semi-hollow beam 30 that extends from an open, free end 42 of blind passageway 37 toward, but does not intersect grip 35. Adjustable beam 32 comprises a cross-sectional shape that is complementary to the shape of blind passageway 37 of semi-hollow beam 30 and includes a back surface 44 and a grip 45 located at one free end. An elongate portion 46 of adjustable beam 32 that extends from grip 45 is sized so as to be slidingly received within blind passageway 37 of semi-hollow beam 30.

First rod 17 and second rod 18 each comprise a resilient beam, i.e., able to spring back quickly into shape after being bent, stretched, or deformed. Each rod 17 and 18 have an elongate length, i.e., at least comparable to the overall length of telephone handset 27 during use. First rod 17 and second rod 18 extend in spaced parallel relation to one another from a portion of pivot hub 20. A top end 47 of first rod 17 and a top end 49 of second rod 18 are each fixedly attached to pivot hub 20. Pivot hub 20 is pivotally mounted to an exterior portion of clamp assembly 5 so that first rod 17 and second rod 18 are operatively connected to pivot hub 20. Each of first rod 17 and second rod 18 is also fixedly attached to a portion 29 (FIG. 2) of back surface 26 of upper clamp 11 along an intermediate portion of the rod's length. A spar 50 may be included along a portion of each rod's length to enhance its structural strength and improve its resiliency. A bottom end 52 of first rod 17 and a bottom end 54 of second rod 18 are each fixedly attached to a separate portion of lower clamp 13. More particularly, bottom end 52 of first rod 17 is fixedly attached to back surface 44 of elongate portion 46 of adjustable beam 32. Bottom end 54 of second rod 18 comprises a yoke 57 that is arranged so as to straddle slot 39 when fixedly attached to rear wall 40 of semi-hollow beam 30 adjacent to open end 42.

Figure 8:
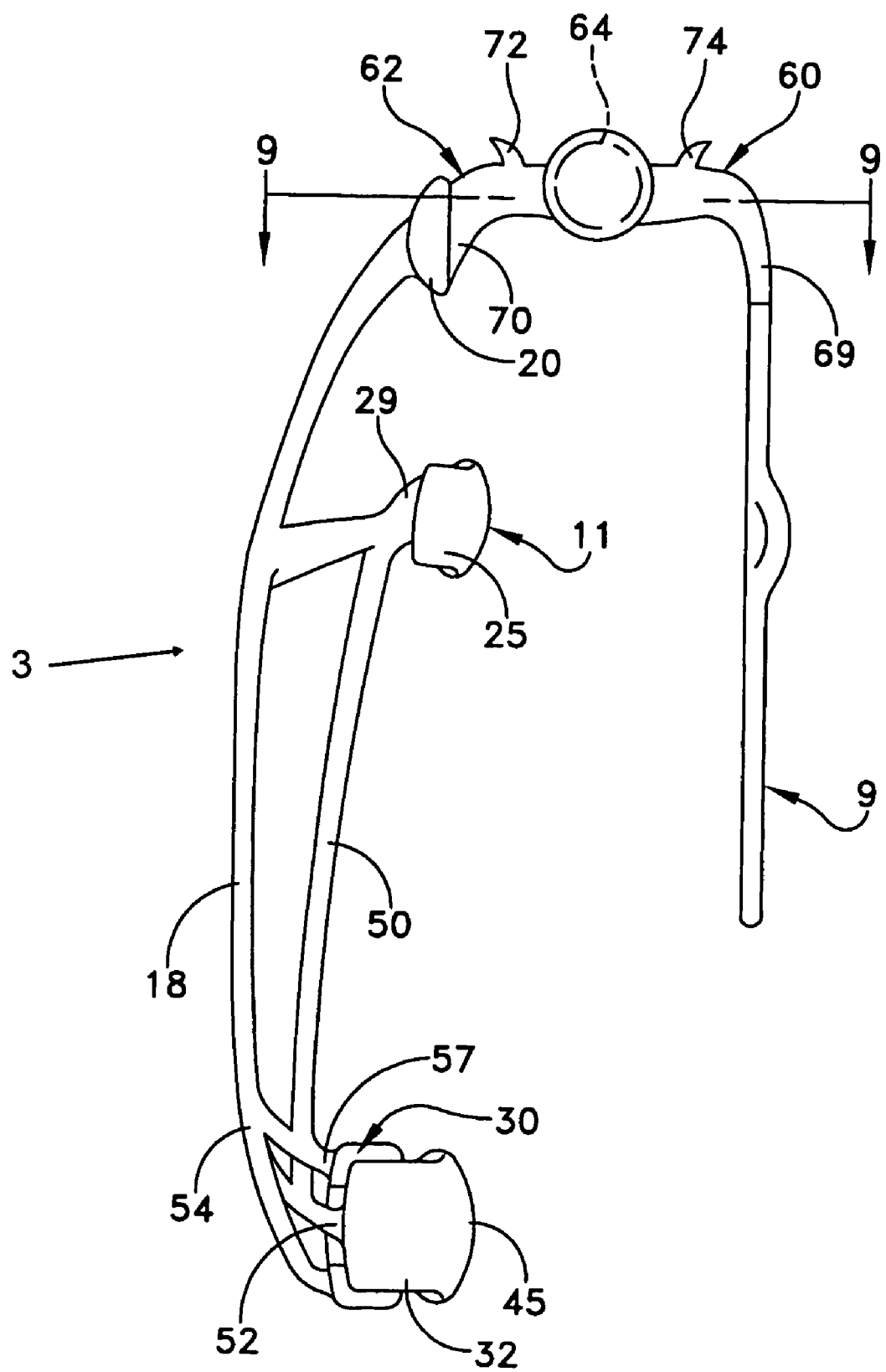
FIG. 8 is an end-on view of a communications handset support for handless operation of a handheld communications device illustrating an outwardly biased clamp assembly.
Figure 9:
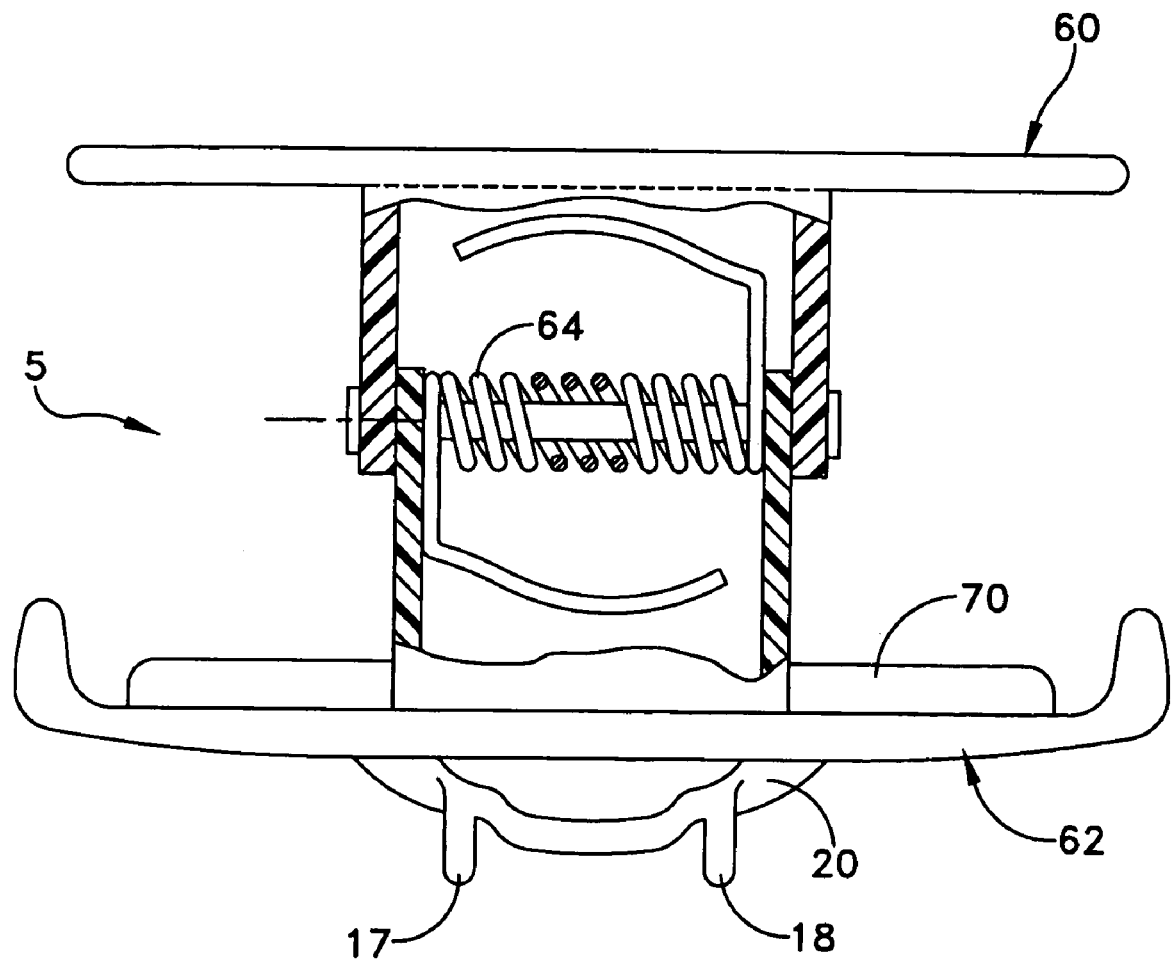
FIG. 9 is a top perspective view, partially in cross-section, of a clamp assembly with biasable torsion spring formed in accordance with the present invention.
Figure 10:
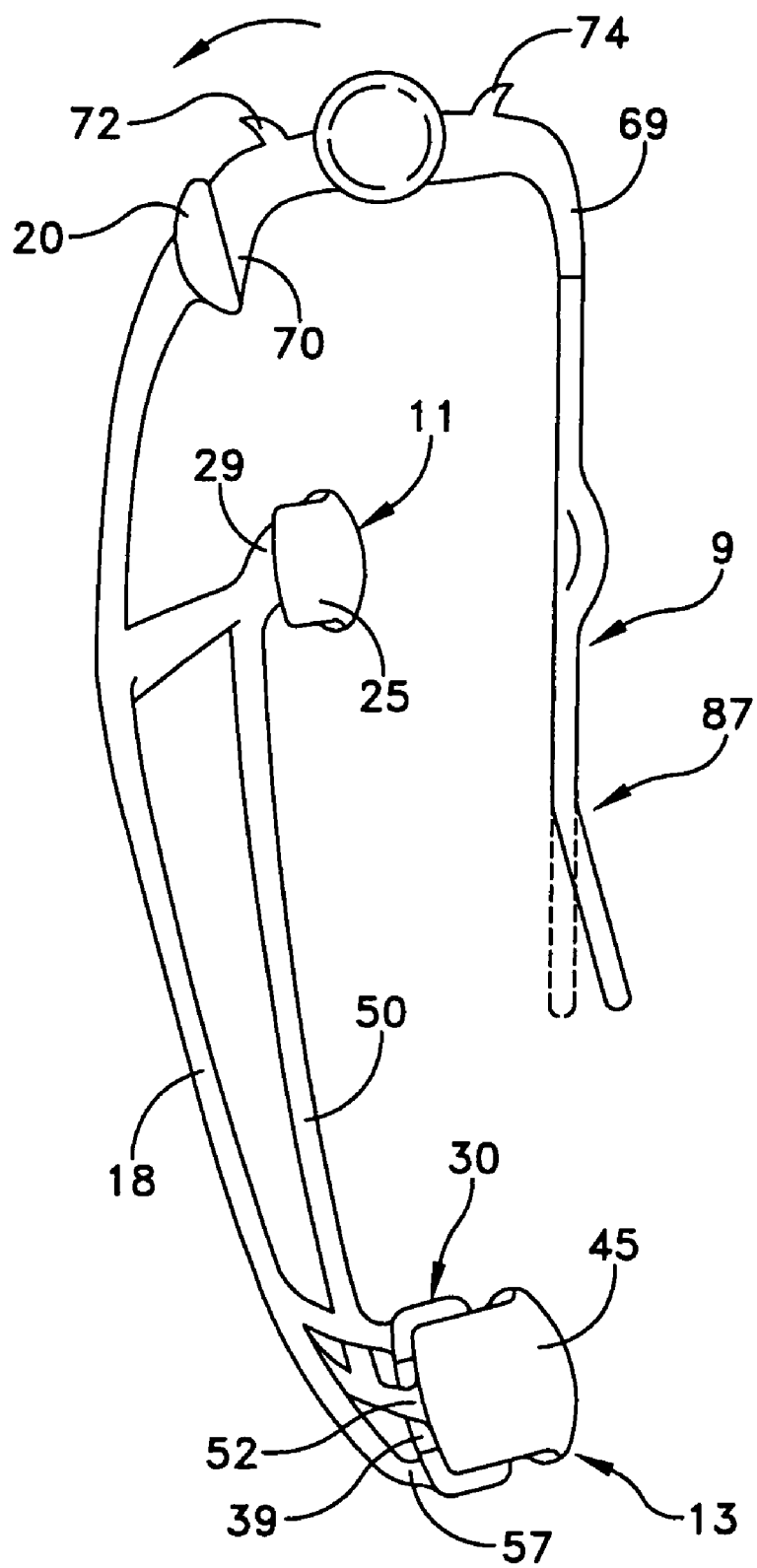
FIG. 10 is an end-on view of a communications handset support for handless operation of a handheld communications device illustrating an inwardly biased clamp assembly.

Referring in particular to FIGS. 8-9, clamp assembly 5 includes jaws 60 and 62 which are hinged together and spring loaded by torsion spring 64. Jaws 60 and 62 are provided with mounting plates 69, 70. Pivot hub 20 may be rotably fastened to mounting plate 70 and ear hook 9 is fixedly fastened to mounting plate 69. Jaws 60 and 62 are opened against a biasing force provided by spring 64 by pressing together tabs 72 and 74 that project outwardly from top portions of jaws 60 and 62. Of course, other resilient energy storage devices may be substituted for spring 64 with adequate results. Tabs 72 and 74 are disposed in spaced apart, confronting relation to one another on the top edges of mounting plates 69, 70 so that torsion spring 64 lies between them (FIG. 8).

Referring to FIGS. 1, 4, 7, 8, 10, and 12, ear hook 9 includes a curved portion 80 and an adjustable face-bar 82. Curved portion 80 includes a crest 83 that is sized and shaped to engage a human ear behind the auricle 81. Crest 83 is fixed to an inner surface of mounting plate 69 of clamp assembly 5. Curved portion 80 is often coated with a soft foam or cloth to make the fitting of ear hook 9 onto the wearer's ear comfortable. Face bar 82 projects from a lower end of curved portion 80 so as to be oriented in a parallel relation to the wearer's cheek. Typically, ear hook 9 is formed with a malleable core material, e.g., a soft copper or steel, so that it may be bent or twisted so as to adjust for different facial shapes and sizes (shown generally at reference number 87 in FIG. 10).

A mobile telephone handset 27 is assembled to handset holder 1 in the following manner. Mobile telephone handset 27 is first oriented so that its back surface is arranged in confronting spaced relation to upper clamp 11 and lower clamp 13. Once in this position, mobile telephone handset 27 is moved toward cradle assembly 3 until its lower side edges engage grips 35 and 45 of lower clamp 13. As this occurs, adjustable beam 32 is forced outwardly, relative to semi-hollow beam 30, as a result of the lower edges of mobile telephone handset 27 engaging grips 35 and 45. As this occurs, first rod 17 acts as a cantilevered spring, i.e., a projecting beam that is clamped so as to be supported at only one end, that is clamped at portion 29 of back surface 26 of upper clamp 11 with its other end 52 fixedly fastened to back surface 44 of adjustable beam 32 through slot 39. As adjustable beam 32 is forced outwardly by mobile telephone handset 27, first rod 17 is deflected and thereby biased so as to store elastic energy. Once adjustable beam 32 has been moved outwardly relative to semi-hollow beam 30 sufficiently so that telephone handset 27 may slip between grips 35 and 45, biased first rod 17 urges adjustable beam 32 and grip 45 against the side surface of mobile telephone handset 27, thereby locking mobile telephone handset 27 within lower clamp 13. At the same time, the upper edge portions of mobile telephone handset 27 engage grips 25 of upper clamp 11 and spread them outwardly. As this occurs, elastic energy is stored within resilient beam portion 23 as it is flexed. In this way, grips 25 are biased against the side edges of mobile telephone handset 27, thereby holding the handset in place within cradle assembly 3.

Figure 11:
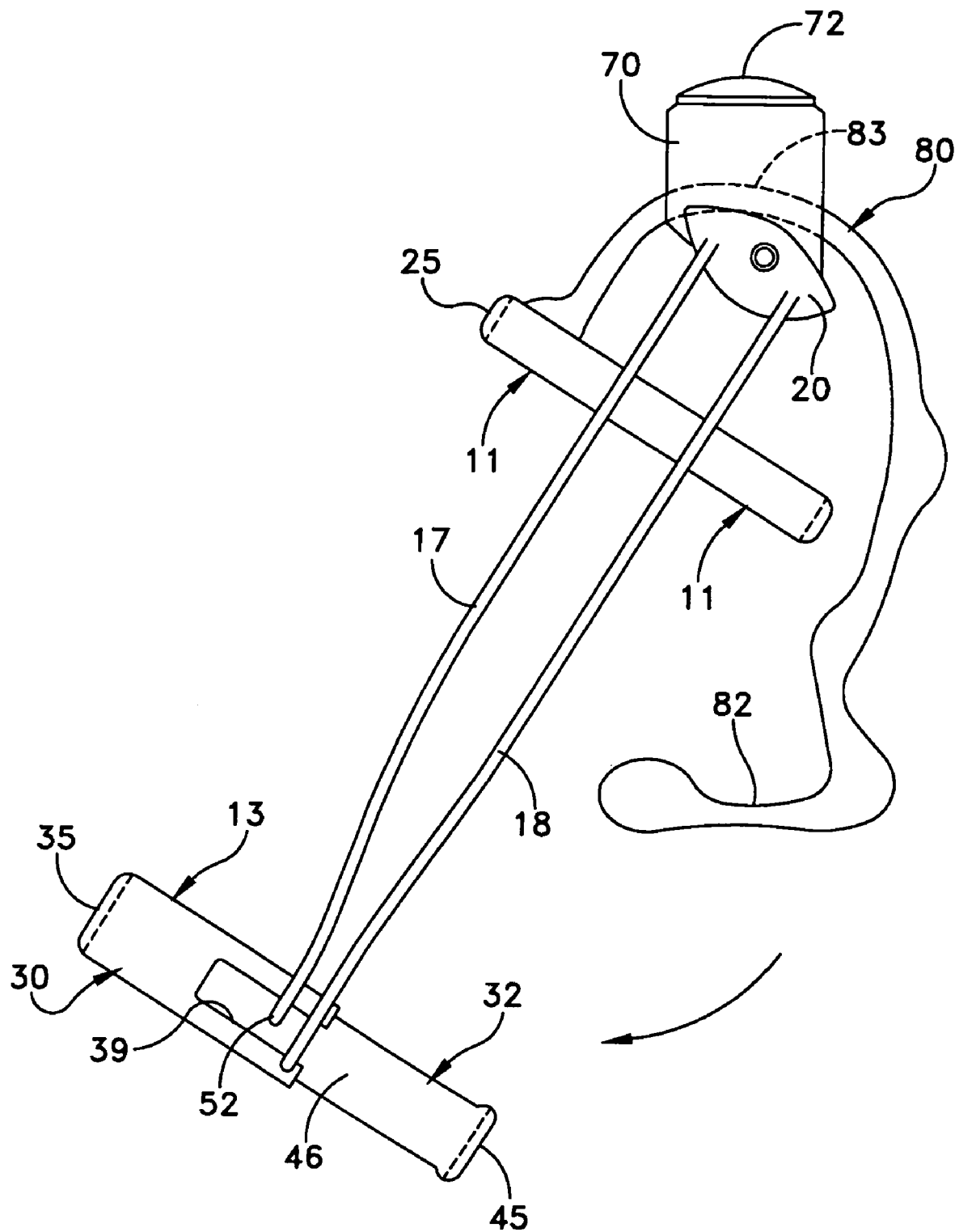
FIG. 11 is a side view of a communications handset support for handless operation of a handheld communications device formed in accordance with the present invention illustrating the rotational relationship between a cradle assembly and a clamp assembly, with a lower clamp arranged in a biased configuration.
Figure 12:
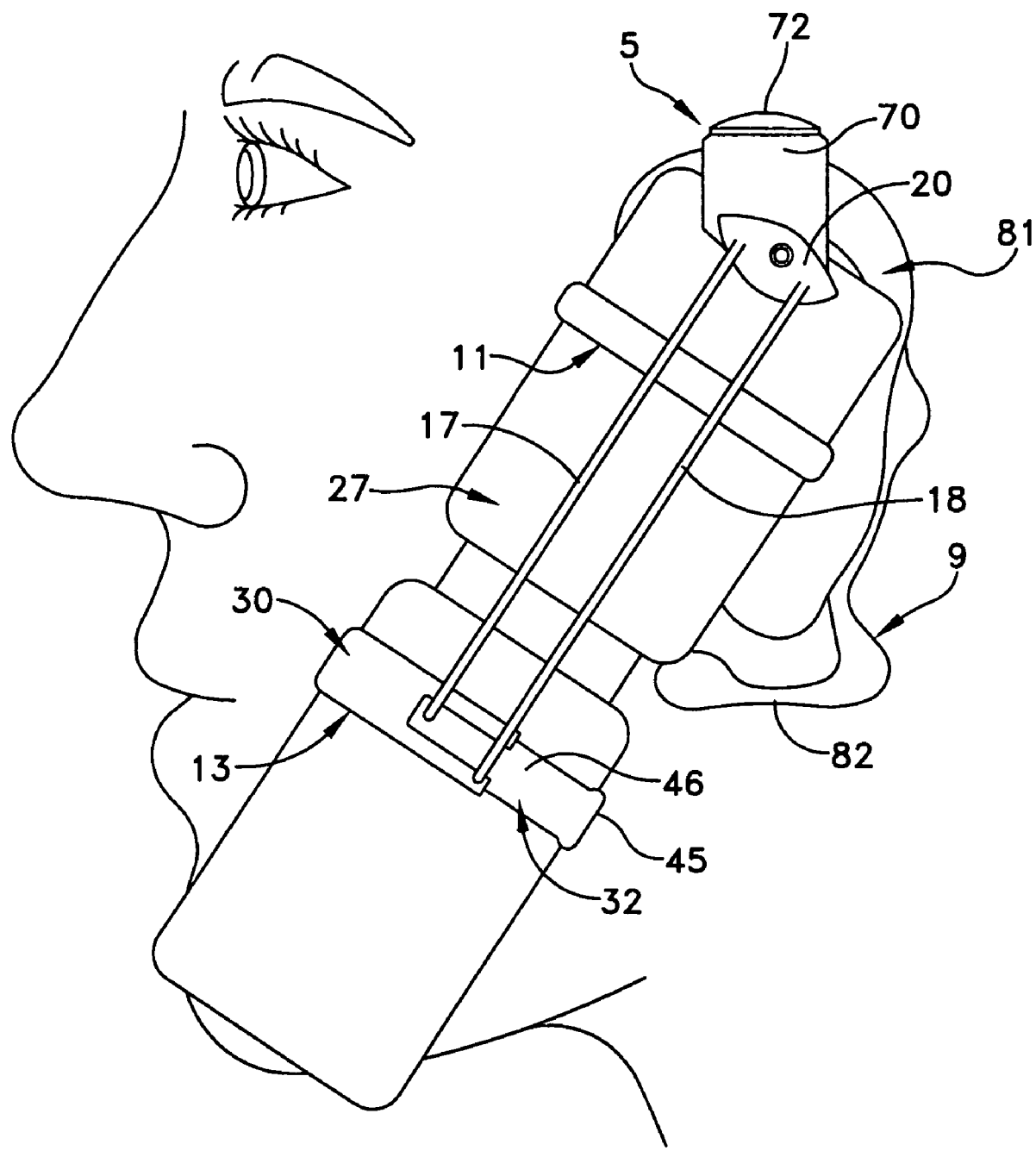
FIG. 12 is a perspective view of a communications handset support for handless operation of a handheld communications device formed in accordance with the present invention, in one preferred orientation of a cradle assembly and communications handset relative to a wearer's face.
Figure 13:
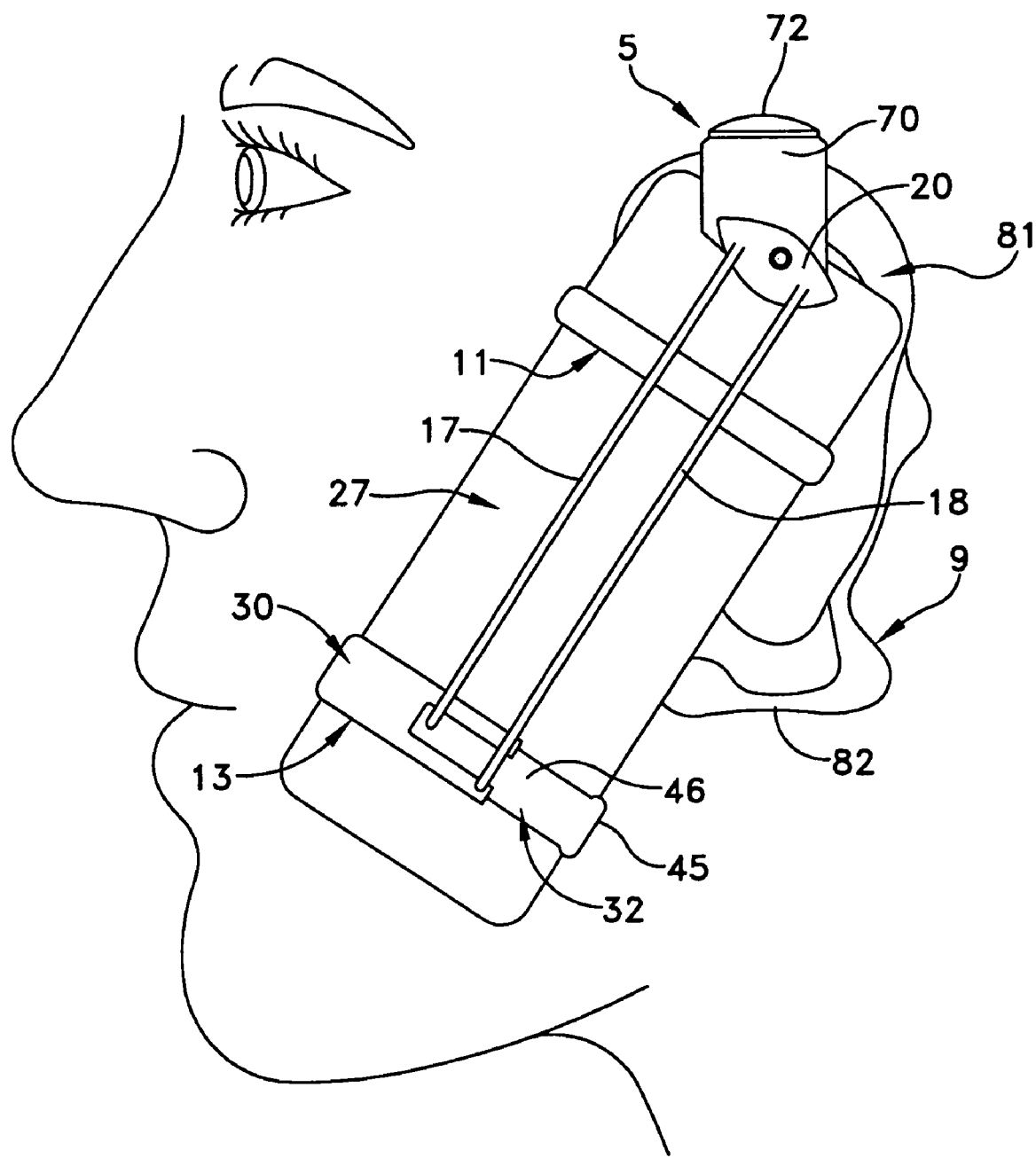
FIG. 13 is a perspective view of a communications handset support for handless operation of a handheld communications device formed in accordance with the present invention, in another preferred orientation of a cradle assembly and communications handset relative to a wearer's face.

With the telephone handset 27 firmly engaged within cradle assembly 3, mobile telephone handset holder 1 may be positioned on a user's ear (FIGS. 11-13). More particularly, mobile telephone handset holder 1 is first oriented such that ear hook 9 is arranged in confronting spaced relation to the user's ear. Once in this position, mobile telephone handset holder 1 is moved towards the user's head until curved portion 80 is positioned above and behind the user's auricle 81. The user then pinches tabs 72 and 74 so as to un-bias spring 64, thereby providing additional room to allow ear hook 9 to slip over auricle 81. Once in this position, ear hook 9 is slid downwardly along the side of the user's head until crest 83 engages the top of auricle 81. The user then releases tabs 72, 74 so that spring 64 biases clamp assembly 5, thereby holding cradle assembly 3 in close proximity to the user's ear. Face bar 82 may be adjusted so as to provide a support against the cheek of the user. Advantageously, when spring 64 biases clamp assembly 5, this causes the lower portion or mouth piece of telephone handset 27 to be moved toward the wearer's face, and in some instances, to be pressed against the wearer's face thereby maintaining telephone handset 27 in proper position for receiving the wearer's voice.

Once in this position, cradle assembly 3 may be pivoted or rotated via pivot hub 20 so as to adjust the position of the mobile telephone for clear reception of the user's voice. Mobile telephone handset holder 1 may be used in conjunction with other one piece hand held communication devices, such as, but not limited to BlackBerry® handheld devices, Palm® handheld devices, handheld personal computers, Treo® handheld devices, or any other portable handheld communication device that provides the user with functionalities in addition to telephony.

It is to be understood that the present invention is by no means limited only to the particular constructions herein disclosed and shown in the drawings, but also comprises any modifications or equivalents within the scope of the claims.

What is claimed is:

1. A communications handset support for handless operation of a handheld communications device, said handset support comprising:
   a cradle assembly for releasably receiving and supporting said communications handset including a pair of elongate spaced-apart rods wherein a first resilient one of said elongate rods is fixed along a portion of its length so as to be cantilevered; and
   a clamp supported upon said pair of spaced-apart rods wherein said clamp includes a semi-hollow beam having a central passageway and that is supported upon a second one of said elongate rods, and an adjustable beam that is slidingly received within said central passageway and that is fastened to an end of said first resilient one of said rods so that when said adjustable beam is slid outwardly and away from said semi-hollow beam, said first resilient one of said rods is biased thereby gripping a portion of said communications handset.

2. A handset support according to claim 1 comprising a cradle assembly including an upper clamp supported upon said pair of spaced-apart rods.

3. A handset support according to claim 2 wherein said upper clamp comprises a substantially arched resilient beam portion having a pair of spaced apart confronting grips.

4. A handset support according to claim 2 wherein a portion of said first resilient one of said elongate rods is fixedly attached to a portion of said upper clamp along an intermediate portion of said first rod's length.

5. A handset support according to claim 1 wherein said semi-hollow beam comprises a substantially arched profile with a grip located at a free end and a blind passageway that is axially defined and centrally located.

6. A handset support according to claim 5 wherein said semi-hollow beam includes a slot that is defined in a rear wall and extends from an open end of said blind passageway toward said grip.

7. A handset support according to claim 5 wherein said adjustable beam comprises a cross-sectional shape that is complementary to the shape of said blind passageway of said semi-hollow beam.

8. A handset support according to claim 5 wherein said adjustable beam is sized so as to be slidingly received within said blind passageway of said semi-hollow beam.

9. A handset support according to claim 1 wherein said first resilient one of said elongate rods extends in spaced parallel relation to said second one of said elongate rods.

10. A handset support according to claim 1 wherein said first resilient one of said elongate rods extends outwardly from a pivot hub located upon a clamp assembly adapted for positioning said handset support adjacent to a user's ear.

11. A handset support according to claim 10 wherein said first resilient one of said elongate rods is fixedly attached to said pivot hub.

12. A handset support according to claim 10 comprising an ear hook including a curved portion sized and shaped to engage a human ear and an adjustable face-bar projecting from a lower end of said curved portion so as to be oriented in a parallel relation to a wearer's cheek.

13. A handset support according to claim 12 wherein said ear hook is coated with a soft foam or cloth to make the fitting of said ear hook onto the wearer's ear comfortable.

14. A handset support according to claim 1 wherein said rods include a spar along a portion of each rod's length.

15. A handset support according to claim 1 comprising a first resilient rod including a first end and a second rod including a first end wherein said first end of said first resilient rod is fixedly attached to said adjustable beam, and said first end of said second rod comprises a yoke that is fixedly attached to said semi-hollow beam.

16. A handset support according to claim 1 wherein said pair of elongate spaced-apart rods extend from a clamp assembly including two opposed jaws that are hinged together and spring loaded and wherein each includes a mounting plate.

17. A handset support according to claim 16 wherein a pivot hub is rotatably fastened to one of said mounting plates and an ear hook is fixedly fastened to another of said mounting plates.

18. A handset support according to claim 17 wherein said jaws are opened against a biasing force provided by said spring by pressing together a pair of spaced-apart tabs that project outwardly from a top portion of said jaws.

19. A communications handset support for handless operation of a handheld communications device, said handset support comprising:
   a cradle assembly including an upper clamp supported upon a pair of spaced-apart rods wherein a first resilient one of said rods is fixedly fastened along a portion of its length to said upper clamp so as to be cantilevered;
   a lower clamp supported upon said pair of spaced-apart rods wherein said lower clamp includes a semi-hollow beam having a central passageway, and an adjustable beam that is slidingly received within said central passageway and being fastened to an end of said first resilient one of said rods so that when said adjustable beam is slid outwardly and away from said semi-hollow beam, said first resilient one of said rods is biased.

20. A communications handset support for handless operation of a handheld communications device, said handset support comprising:
   an ear hook extending from a clamp assembly;
   a cradle assembly extending from said clamp assembly in substantially parallel relation to said ear hook, said cradle assembly including an upper clamp supported upon a pair of spaced-apart rods wherein a first resilient one of said rods is fixedly fastened along a portion of its length to said upper clamp so as to be cantilevered;
   a lower clamp supported upon said pair of spaced-apart rods wherein said lower clamp includes a semi-hollow beam having a central passageway, and an adjustable beam that is slidingly received within said central passageway and being fastened to an end of said first resilient one of said rods so that when said adjustable beam is slid outwardly and away from said semi-hollow beam, said first resilient one of said rods is biased.

21. A communications handset support for handless operation of a handheld communications device, said handset support comprising:
   an ear hook extending from a clamp assembly;
   a cradle assembly extending from said clamp assembly in substantially parallel relation to said ear hook, said cradle assembly including an upper clamp supported upon a pair of spaced-apart rods wherein a first resilient one of said rods is fixedly fastened along a portion of its length to said upper clamp so as to be cantilevered;

a lower clamp supported upon said pair of spaced-apart rods wherein said lower clamp includes a semi-hollow beam having a central passageway, and an adjustable beam that is slidingly received within said central passageway and being fastened to an end of said first resilient one of said rods so that when said adjustable beam is slid outwardly and away from said semi-hollow beam, said first resilient one of said rods is biased; wherein said pair of elongate spaced-apart rods extend from said clamp assembly including two opposed jaws that are hinged together and spring loaded and further wherein each includes a mounting plate such that said jaws are opened against a biasing force provided by said spring by pressing together a pair of spaced-apart tabs that project outwardly from a top portion of said jaws such that when said spring biases said clamp assembly a lower portion of a handheld communications device is moved toward a wearer's face so as to be pressed against said wearer's face thereby maintaining said a handheld communications device in proper position for receiving said wearer's voice.

* * * * *